UNITED STATES PATENT OFFICE.

JOHN CARNRICK, OF NEW YORK, N. Y.

MEDICINAL EMULSION.

SPECIFICATION forming part of Letters Patent No. 327,229, dated September 29, 1885.

Application filed March 1, 1884. (Specimens.)

*To all whom it may concern:*

Be it known that I, JOHN CARNRICK, of the city, county, and State of New York, have invented certain Improvements in Nutritive and Medical Emulsions or Compositions, of which the following is a specification.

This invention relates to a nutritive and medical composition or emulsion, which is agreeable in appearance and taste, and possesses highly nutritious, invigorating, and remedial qualities, for use in cases of debility and all such cases in which physicians would prescribe a readily digested and assimilated nutritive tonic.

The essential ingredients of my improved emulsion are cod-liver oil and milk mixed together in suitable proportions — as, for instance, twenty to eighty parts of oil with twenty to eighty parts of milk — and, where required, a small proportion of any suitable mucilaginous substance — as gum-arabic or its equivalent — in sufficient quantity to assist in preserving the union of the oil and milk in the permanent form of an emulsion. The milk used in preparing the emulsion may previously be reduced to one-half (more or less) of its natural density by removing a portion of the water by evaporation. In order that the emulsion may be more readily digested and assimilated, and therefore better suited to persons with weak or sensitive stomachs, the oil and milk may be digested with pepsin or pancreatine. The thus peptonized emulsion is quite palatable, is in the best form for digestion, and is readily assimilated. The pepsin or pancreatine used is preferably dissolved in glycerine previous to its mixture with the oil and milk. The glycerine assists in maintaining the union of the oil and milk, and also acts as a preservative. To better fit the emulsion for a nutritive tonic, I combine or mix with it one or more of the hypophosphites — as hypophosphite of lime or hypophosphite of soda, or both. The hypophosphites are dissolved in the milk previous to the formation of the emulsion, or they may be rubbed up with the oil, or they may be added in the form of powder to the emulsion. The hypophosphites are mixed with the oil and milk in such proportions that a dose thereof (ten to thirty grains) will be present in every dose of the emulsion, such as a table-spoonful or other suitably-sized dose.

In preparing the emulsion, I mix together about equal quantities of oil and milk, digested with pancreatine solution in the usual manner of preparing emulsions, using a sufficient quantity of mucilaginous substance to make the emulsion permanent.

The proportion of milk used depends somewhat upon its degree of concentration. I prefer as a rule that the milk be somewhat concentrated by evaporation. The hypophosphites are mixed with the oil or milk or the emulsion in about the proportion mentioned. The milk and oil may both be digested with the pancreatine separately or together, or only one of them may be digested with the pancreatine, as thought most expedient or desirable. In some cases diastase of malt may be used as the digestive agent.

The use of milk, and especially concentrated milk, in making the emulsion possesses important advantages over water, ordinarily used, for with it the emulsion is more easily formed, and, besides, the milk contains all the necessary constituents to maintain healthy nutrition, and is therefore a valuable aid to the oil as a nutritive.

By digesting the milk and oil, or either one of them, with pepsin or pancreatine, the emulsion formed is most readily digested and assimilated by the person using it. A small quantity of any suitable preservative agent — such as boracic acid — may, if desired, be added to the preparation.

I am aware that emulsion of cod-liver oil with digestive ferments is not new, and that glycerine and hypophosphites have been added to such emulsions with gum as the suspending agent. Such, therefore, I do not claim; but, Having described my invention, what I claim, and desire to secure by Letters Patent, is—

A nutritive and medicinal emulsion consisting of cod-liver oil, concentrated milk, a digestive ferment — as pancreatine dissolved in glycerine — and one or more of the hypophosphites, such as hypophosphite of lime or soda.

JOHN CARNRICK.

Witnesses:
ABM. HEARTT,
M. VAN COTT.